United States Patent [19]
Baker

[11] Patent Number: 5,113,468
[45] Date of Patent: May 12, 1992

[54] FIBRE-OPTIC CABLE ASSEMBLIES

[75] Inventor: Peter D. Baker, Basingstoke, England

[73] Assignee: Smiths Industries Public Limited Company, London, England

[21] Appl. No.: 666,636

[22] Filed: Mar. 8, 1991

[30] Foreign Application Priority Data

Mar. 14, 1990 [GB] United Kingdom ............... 9005741

[51] Int. Cl.⁵ .......................... G02B 5/14; G02B 6/44
[52] U.S. Cl. ...................................... 385/100; 385/109
[58] Field of Search ............................. 350/96.23

[56] References Cited

U.S. PATENT DOCUMENTS

| | | | |
|---|---|---|---|
| 4,331,378 | 5/1982 | Hartig | 350/96.23 |
| 4,653,851 | 3/1987 | Pedersen et al. | 350/96.23 |
| 4,687,293 | 8/1987 | Randazzo | 350/96.23 |
| 4,763,982 | 8/1988 | Greveling | 350/96.23 |
| 4,875,757 | 10/1989 | Greveling | 350/96.23 |
| 4,887,354 | 12/1989 | Van Der Maaden | 350/96.23 X |

Primary Examiner—Akm E. Ullah
Attorney, Agent, or Firm—Pollock, Vande Sande & Priddy

[57] ABSTRACT

A fibre-optic cable has a silica optical fibre within a fluoropolymer sleeve. The optical fibre extends between two couplings and is protected by a sheath that is fixed at each end to the couplings. The sheath comprises parallel silica filaments that extend between two braided aramid sleeves. The sheath is completed by an outer tube of a fluoropolymer resin extruded onto the braided sleeves so that its material flows through them and the filaments. The filaments restrain thermal expansion of the sheath to an expansion closely matched to that of the optical fibre.

11 Claims, 2 Drawing Sheets

& 1

FIBRE-OPTIC CABLE ASSEMBLIES

BACKGROUND OF THE INVENTION

This invention relates to fibre-optic cable assemblies.

Where fibre-optic cables are used in environments subjected to repeated, large changes in temperature, the optical fibre can become damaged as a result of differential thermal expansion effects in the cable. The optical fibre is often made from a silica material which has a low coefficient of thermal expansion. The problem with this is that the sheath within which the fibre extends is of a different material with a markedly different coefficient of expansion. Where the sheath is of a glass fibre, this has a relatively high positive temperature coefficient whereas a sheath made of an aramid such as Kevlar may have a negative coefficient of expansion. Where both the fibre and the sheath are fixed in terminations at both ends, it can be seen that this will result in a force on the fibre. Depending on the way in which the cable is terminated and on whether the temperature is increasing or decreasing, this force could result in movement of the fibre within the termination or cause fatigue, as a result of repeated compressive or tensile forces. Movement of the fibre is undesirable because it can lead to inefficiency in optical coupling; it can also lead to damage of the fibre. Stress of a fibre which is fixed immovably within a termination can lead to fracture or change in the optical properties of the fibre.

SUMMARY OF THE INVENTION

It is an object of the present invention to provide a fibre-optic cable assembly which can be used to alleviate the above-mentioned problems.

According to one aspect of the present invention there is provided a fibre-optic cable assembly including at least one optical fibre, a sheath within which the fibre extends along a major part of its length and a termination at each end of the assembly to which the fibre extends, the sheath being secured to the terminations at each end and including at least one filament of a material having substantially the same coefficient of expansion as the fibre, and the or each filament extending along and within the sheath such as to restrain expansion of the sheath to an expansion closely matched to that of the fibre.

The or each filament is preferably bonded to the sheath along its length.

The filament may be of the same material as the optical fibre and may be of silica. The sheath preferably includes a plurality of filaments extending parallel to one another. The sheath may include a first braided sleeve extending along the optical fibre between the or each filament and the optical fibre. The sheath preferably includes a second braided sleeve externally of the or each filament and may include an outer tube externally of the second braided sleeve, the material of the outer tube being flowed through the second braided sleeve, the or each filament and into the first braided sleeve. The outer tube may be extruded about the second braided sleeve and may be of a fluoropolymer resin. The or each braided sleeve may be of an aramid. The assembly may include a buffer sleeve around the optical fibre within the sheath; the buffer sleeve is preferably of a solid polymer. The sheath may be secured to the terminations by clamping or by potting with a hardenable compound. The optical fibre is preferably fixed at the terminations and the terminations may be couplings.

Fibre-optic cable assemblies in accordance with the present invention, will now be described, by way of example, with reference to the accompanying drawings.

DESCRIPTION OF THE PREFERRED EMBODIMENTS

Figure 1:
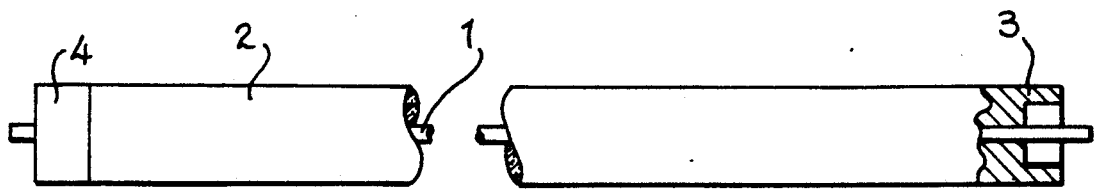
FIG. 1 is a simplified cross-section elevation view of one form of assembly.

With reference first to FIG. 1 there is shown the cable assembly which includes an optical fibre 1 that extends along the length of the assembly within an outer sheath 2. The sheath 2 is fixed at opposite ends at terminations 3 and 4 in the form of optical couplings.

Figure 2:
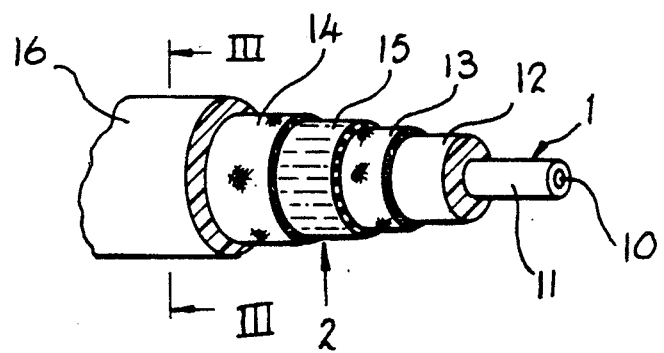
FIG. 2 is a perspective cut-away view to an enlarged scale of a part of the assembly.
Figure 3:
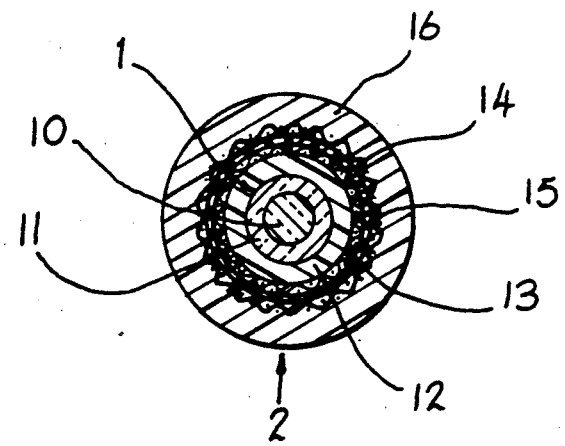
FIG. 3 is a transverse section along the line III—III of FIG. 2.
Figure 4:
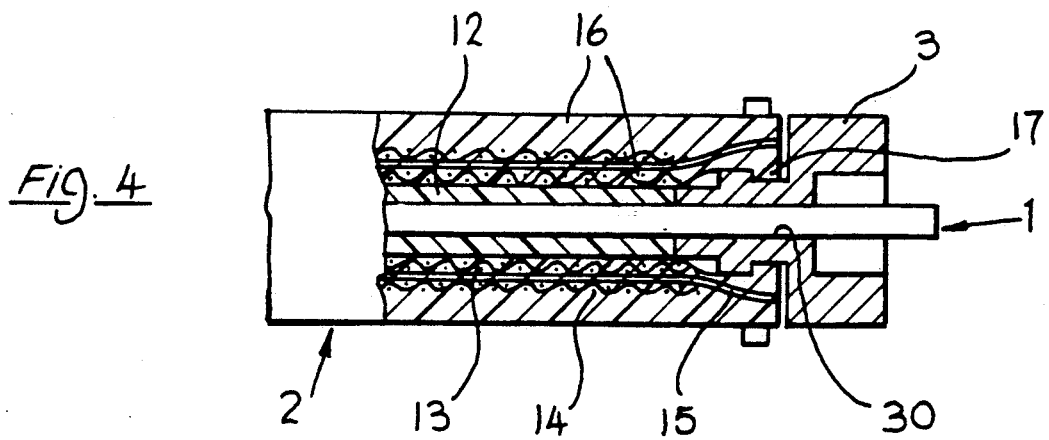
FIG. 4 is a sectional side elevation view of another part of the assembly.

The construction of the assembly is shown in greater detail in FIGS. 2 to 4. The fibre 1 is of conventional construction comprising an inner core 10 of silica surrounded by a cladding 11 also of silica but having a low refractive index so that optical radiation supplied to the core undergoes total internal reflection at the boundary between the core and the cladding in the usual way. The fibre 1 is closely embraced by a buffer sleeve 12 which is of a solid material such as a high temperature resistant flexible polymer, for example, a fluoropolymer resin. Embracing the buffer sleeve 12 are coaxial inner and outer braided sleeves 13 and 14 which may be of braided silica fibres, or a high temperature resistant polymer such as an aramid (for example, Kevlar). Interleaved between the two braided sleeves 13 and 14 is a novel tension member 15 which consists of a sleeve formed of silica filaments which extend parallel to the axis of the cable assembly. The silica from which the filaments are made is the same type as that used to make the fibre 1 so that they have the same coefficient of thermal expansion. An external tube 16 is extruded about the outer braided sleeve 14, the material of the tube 16 flowing through the braided sleeve 14 and the tension member 15 and into the inner braided sleeve 13. In this way, the tube 16 becomes bonded to the braided sleeves 14 and 13 and the tension member 15 when the material of the tube sets. The tube 16 is made from an impervious material that is resistant to high temperatures and abrasion, such as a fluropolymer resin or similar polymer. Fluoropolymer resins have the advantage that, at extrusion temperatures, they are sufficiently reactive to etch the surface of silica to form a good key for bonding.

The coupling 3 is a generally cylindrical metal component with a central bore 30 through which the fibre 1 projects. The tube 16 is secured to the outside of the coupling 3, such as by clamping. In this respect, the end of the tube 16 may be moulded with a projection such as a rib 17 which locates in a recess on the coupling. Alternatively, the tube 16 could be secured to the coupling 3 in other ways, such as by potting in a hardenable material such as an epoxy resin.

At the rear of the cable, the coupling 4 is joined with the fibre 1, and the outer tube 16, in the same way as the forward coupling 3. Both the couplings 3 and 4 are shaped to mate with cooperating optical couplings, not shown.

Because the tension member 15 has the same coefficient of thermal expansion as the fibre 1, it prevents the sheath 2 of the cable assembly expanding by an amount different from the fibre 1.

The fibre 1 may be free to slide along the bore 30, in which case, the sheath 2 would reduce the amount of movement of the fibre relative to the coupling 3 on thermal cycling. Alternatively, the fibre 1 may be fixed in the bore by clamping or potting, in which case, the stress on the fibre caused by compressive or tension forces is reduced by means of the sheath 2 and the effective life of the assembly is increased.

Where maximum efficiency of optical coupling is required, it will generally be preferable to fix the fibre within the cooperating optical couplings.

It is not essential for the filaments of the tension member 15 to be made of the same material as the fibre 1, providing that they have substantially the same coefficient of thermal expansion. Preferably, the filaments are electrically non-conductive.

The terminations at the end of the cable assembly need not be couplings but could, for example, be an optical source or detector.

In the arrangement described above, the sheath 2 is a tight fit about the fibre 1. Alternative arrangements are possible in which the sheath is a loose fit on the fibre. For example, with reference to FIG. 5, the sheath 2' lacks any buffer sleeve and the braided sleeve 13' is a relatively loose fit about fibre 1'.

Figure 5:
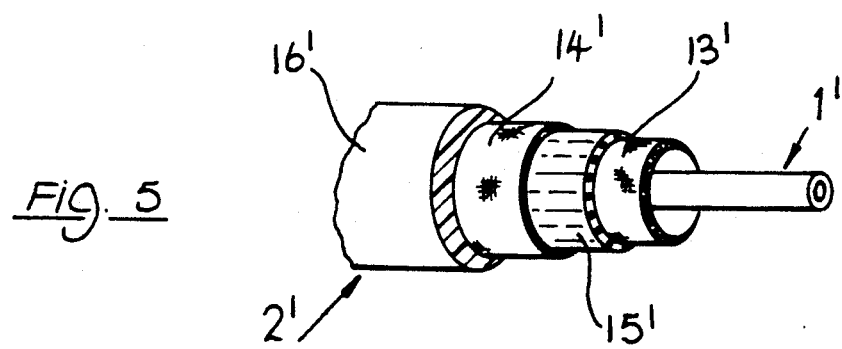
FIGS. 5 and 6 are perspective cut-away views showing two alternative assemblies.
Figure 6:
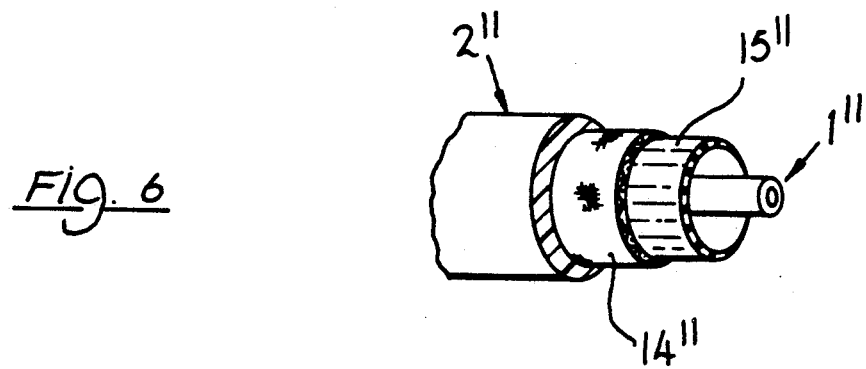

A further alternative arrangement is shown in FIG. 6 which is similar to that of FIG. 5, except in that it lacks the inner braided sleeve and that the tension member 15" forms the inner component of the sheath 2", adjacent the fibre 1".

The cable assemblies shown in FIGS. 4 and 5 will be lighter and more flexible than the assembly of FIG. 1 but will not afford as much protection to the fibre.

What I claim is:

1. A fibre-optic cable assembly comprising: at least one optical fibre; a sheath, the optical fibre extending internally along a major part of the length of the sheath; a termination at each end of the assembly to which the optical fibre extends; and means securing the sheath to the terminations at each end; the sheath including a braided sleeve and at least one filament of a material having substantially the same coefficient of thermal expansion as the optical fibre, said filament extending along and within a wall of the sheath and being operative to restrain thermal expansion of the sheath to an expansion closely matched to that of the optical fibre.

2. An assembly according to claim 1, wherein the filament is bonded to the sheath along its length.

3. An assembly according to claim 1, wherein the filament is of the same material as that of the optical fibre.

4. An assembly according to claim 1, wherein the sheath includes a plurality of said filaments extending parallel to one another.

5. An assembly according to claim 1, wherein the braided sleeve extends along the optical fibre between the filament and the optical fibre.

6. An assembly according to claim 5, wherein the sheath includes a second braided sleeve externally of the filament.

7. An assembly according to claim 6, wherein the sheath includes an outer tube externally of the second braided sleeve, the material of the outer tube being flowed through the second braided sleeve, the filament and into the first mentioned braided sleeve.

8. An assembly according to claim 7, wherein the outer tube is of a fluoropolymer resin.

9. An assembly according to claim 5, wherein the braided sleeve is of an aramid.

10. An assembly according to claim 1, including means fixing the optical fibre at the terminations.

11. A fibre-optic cable assembly comprising: at least one optical fibre; a coupling at each end of the assembly into which the optical fibre is fixed; a sheath, the optical fiber extending internally of the sheath along the length of the assembly; and means securing opposite ends of the sheath to respective ones of the couplings, the sheath including first and second braided sleeves extending coaxially of one another, a plurality of filaments having substantially the same coefficient of thermal expansion as the optical fibre, the filaments extending along the length of sheath between the first and second braided sleeves, and the filaments being bonded to the braided sleeves by a settable, flowable material flowed into the braided sleeves and between the filaments.

* * * * *